US008802739B2

(12) United States Patent
Mangano et al.

(10) Patent No.: US 8,802,739 B2
(45) Date of Patent: Aug. 12, 2014

(54) DEFOAMING AGENTS AND ARTICLES AND METHODS USING SAME

(75) Inventors: John Mangano, Broomall, PA (US); Vasudevan Balasubramaniam, Loveland, OH (US); Daniel Herzog, Northampton, PA (US)

(73) Assignee: Cognis IP Management GmbH, Duesseldorf (DE)

( * ) Notice: Subject to any disclaimer, the term of this patent is extended or adjusted under 35 U.S.C. 154(b) by 506 days.

(21) Appl. No.: 13/084,604

(22) Filed: Apr. 12, 2011

(65) Prior Publication Data

US 2011/0248213 A1 Oct. 13, 2011

Related U.S. Application Data

(60) Provisional application No. 61/323,329, filed on Apr. 12, 2010.

(51) Int. Cl.
 *B01D 19/04* (2006.01)
 *C08K 5/06* (2006.01)
 *C08L 13/02* (2006.01)

(52) U.S. Cl.
 USPC ........... 516/134; 516/116; 524/377; 524/762; 524/474; 524/366; 524/505

(58) Field of Classification Search
 USPC .......... 516/116, 134; 524/366, 377, 474, 502, 524/505, 762
 See application file for complete search history.

(56) References Cited

U.S. PATENT DOCUMENTS

| | | | | |
|---|---|---|---|---|
| 3,562,196 | A * | 2/1971 | Bissot | 523/339 |
| 5,510,409 | A * | 4/1996 | Romano | 524/322 |
| 5,525,657 | A * | 6/1996 | Anchor et al. | 524/261 |
| 5,800,738 | A * | 9/1998 | Hart | 516/115 |
| 5,916,935 | A * | 6/1999 | Wiggins et al. | 523/335 |
| 6,579,908 | B1 * | 6/2003 | Penny et al. | 516/31 |
| 6,583,185 | B2 | 6/2003 | Wiggins et al. | |
| 8,119,717 | B2 * | 2/2012 | Anchor et al. | 524/425 |
| 8,383,710 | B2 * | 2/2013 | Kuo et al. | 524/317 |
| 8,431,639 | B2 * | 4/2013 | Anchor | 516/113 |
| 2007/0298985 | A1 * | 12/2007 | Poirier et al. | 516/133 |
| 2009/0188618 | A1 * | 7/2009 | Burke et al. | 156/277 |

FOREIGN PATENT DOCUMENTS

| | | | |
|---|---|---|---|
| EP | 1 568 740 A2 | * | 8/2005 |
| WO | WO 00/50147 | * | 8/2000 |
| WO | WO 2009/106252 A1 | * | 9/2009 |

OTHER PUBLICATIONS

ASTM International, Designation: D3960-05; "Standard Practice for Determining Volatile Organic Compound (VOC) Content of Paints and Related Coatings"; Aug. 2005, ASTM International, West Conshchocken, PA, USA, Downloaded Sep. 22, 2010.*
ASTM International, Designation: D2369-07; "Standard Test Method for Volatile Content of Coatings"; Aug. 2007, ASTM International, West Conshchocken, PA, USA, pp. 276-279.*
Pryde, E.H., Chapter 3 Physical properties of soybean oil, Handbook of soy oil processing and utilization 1980. USDA, Peoria, IL, USA, (1980—month unknown), pp. 33-47, obtained online @ http://naldc.nal.usda.gov/download/28495/PDF.*
"Viscosity", CRC Handbook of Chemistry and Physics, 62nd Edition, pp. F-40 to F-41 (1981-1982) [no month].*
G & W Electric Co., MSDS for INDOPOL® L-14, (Jul. 2, 2012), pp. 1-8, obtained online @ http://www.gwelec.com/documents/pdfs/msds_gw218.pdf.*
CAS Online, Registry File, RN 64742-52-5, Entry date Nov. 16, 1984, p. 1 of 1.*
MSDS for Paraffin Oil, RPM wood Finishes Group, Inc., Hickory, NC, USA, (Jun. 2007), pp. 1-9, obtained online @ http://www.rockler.com/tech/RTD20000118AB.pdf.*
Lewis, Richard J., Sr. (2002) Hawley's Condensed Chemical Dictionary (14th Edition), John Wiley & Sons, Online @ http://app.knovel.com/web/toc.v/cid:kpHCCDE006/viewerType:toc/root_slug:hawleys-condensed-chemical/url_slug:hawleys-condensed-chemical/?, headword = mineral oil, paraffin oil, white oil, (Knovel Release Date: Sep. 4, 2003.*

* cited by examiner

Primary Examiner — Daniel S Metzmaier
(74) Attorney, Agent, or Firm — Servilla Whitney LLC

(57) ABSTRACT

Disclosed are low VOC defoaming agents comprising at least one active defoaming compound or combination of defoaming compounds, and a liquid carrier comprising one or more organic compounds having a viscosity of less than about 100 centistokes (cSt) at 40° C. as measured by ASTM D445, having a VOC content as measured by ASTM method D3960 "Standard Practice for Determining Volatile Organic Compound (VOC) Content of Paints and Related Coatings" of not greater than about 1% by weight.

5 Claims, No Drawings

DEFOAMING AGENTS AND ARTICLES AND METHODS USING SAME

CROSS REFERENCE TO RELATED APPLICATIONS

This application claims the priority of U.S. provisional application No. 61/323,329, filed Apr. 12, 2010, which is incorporated herein by reference in its entirety.

FIELD OF THE INVENTION

The present invention relates to defoaming agents and to their application in coating compositions, paints and the like, and to compositions, articles and methods using such defoaming agents.

BACKGROUND OF THE INVENTION

In many liquid systems, especially those systems which include surface-active compounds which are intentionally included constituents, or even unwanted constituents, it is possible for problems to occur as a result of foaming, either in the manufacture of the composition, the use of the composition or both. For example, compositions such as polymer latexes and latex paints can exhibit a tendency toward foaming because they contain surface active agents such as soaps and/or synthetic detergents. In many cases, such compositions produce excessive foam, and substances known as defoamers, defoaming agents or anti-foaming agents are used to reduce the foaming to an acceptable level for the intended use. Defoaming agents are sometimes also used for liquid systems that are contacted with gaseous substances, such as during the gassing of waste waters, during the intensive stirring of liquids, during distillation, washing or coloring operations or during dispensing processes, for example.

Although the defoaming agents must be able to help control or minimize the amount of foaming that occurs in the intended application, it is also important that such materials do not have a negative impact on the functional properties of the materials with which they are used. Thus, for example, an antifoaming agent which effectively eliminates or minimizes foaming in a latex paint but which makes the paint not properly spreadable because of changes in viscosity, for example, would not be acceptable.

The defoaming agents that have heretofore been used have typically included an active ingredient and a carrier material, among other possible components. Applicants have found and have come to appreciate that many prior defoaming agents have a potentially significant disadvantage in that they comprise or consist of volatile organic compounds (VOC) and/or are not able to achieve high levels of defoaming performance without negatively impacting the performance of the composition with which it will be used.

BRIEF SUMMARY OF THE INVENTION

Applicants have found surprisingly effective and efficient, low VOC defoaming agents comprising at least one active defoaming compound or combination of compounds and a liquid carrier comprising and preferably consisting essentially of, and even more preferably consisting of, one or more organic compounds having a viscosity of less than about 100 centistokes (cSt) at 40° C. as measured by ASTM D445, and preferably in certain embodiments from about 5 to less than about 100 cSt at 40° C. as measured by ASTM D445, and a VOC content as measured by ASTM method D3960 "Standard Practice for Determining Volatile Organic Compound (VOC) Content of Paints and Related Coatings" of not greater than about 1% by weight.

DETAILED DESCRIPTION OF PREFERRED EMBODIMENTS

It is contemplated that the defoaming agents of the present invention are adaptable for use with all currently used active defoaming components, and will further be adaptable for use with such active defoaming components yet to be developed. Furthermore, it is contemplated that the concentration or amount of active defoaming agent(s) may vary widely within the scope of the present invention. For example, it is contemplated that in preferred embodiments the active defoaming agent(s) is present in the composition in amounts of from about 0.5% to about 99% by weight of the composition, more preferably in certain embodiments of from about 0.5% to about 15% by weight of the composition, and even more preferably in certain embodiments of from about 2% to about 12% by weight of the composition.

As used herein, the term "active defoaming compound" means any compound or combination of compounds having the effect of reducing and/or preventing foam or foaming in liquid systems, preferably aqueous systems, including microfoaming. Although it is contemplated that the present defoaming agents are adaptable for use with any of the known active defoaming compounds, it is preferred in many embodiments that the active defoaming compounds comprise hydrophobic polyethylene oxide glycol ether(s), and particularly, such compounds as currently included in products sold by Cognis Corporation. Such active defoaming compounds are described in U.S. Pat. No. 6,583,185, which is incorporated herein by reference in its entirety. Other active defoaming compounds, such as, silica, hydrophobed silica, polyethylene wax, ethylene bisstearamide wax, polypropylene wax, polydimethylsiloxane, organically modified polydimethylsiloxane, hydrophobed polyethylene oxide glycerol ethers, and oxidized polyethylene homopolymer wax may be used alone or in combination with one or more of the other active defoaming compounds.

Similarly, it is contemplated that a large variety and number of carriers are adaptable for use in accordance with the present invention in view of the teachings contained herein. In preferred embodiments, the liquid carrier comprises, and preferably consists essentially of, and even more preferably consists of, one or more organic compounds having a viscosity of about 50 centistokes (cSt) or less at 40° C. as measured by ASTM D445 and a VOC content as measured by ASTM method D3960 "Standard Practice for Determining Volatile Organic Compound (VOC) Content of Paints and Related Coatings" of not greater than about 1% by weight. Preferably in certain embodiments, the liquid carrier comprises, and preferably consists essentially of, and even more preferably consists of, one or more organic compounds having a viscosity of from about 5 to about 50, and more preferably from about 15 to about 30, and even more preferably of from about 15-25, centistokes (cSt) at 40° C. as measured by ASTM D445 and a VOC content as measured by ASTM method D3960 "Standard Practice for Determining Volatile Organic Compound (VOC) Content of Paints and Related Coatings" of not greater than about 1% by weight, more preferably of not greater than about 0.5% by weight.

It is contemplated that the carrier of the present invention may be any liquid, and preferably a substantially water insoluble liquid, and even more preferably an organic liquid, that can dissolve and/or disperse one or more of the active defoaming compounds in accordance with the invention. Accordingly, in certain preferred embodiments, the carrier may be comprised of one or more of paraffinic and/or naphthenic oils, tall oil fatty acids, alkoxylated tall oil fatty acids, fatty alcohols, alkoxylated fatty alcohols, liquid polypropylene oxides, liquid polyethylene oxides, liquid poly(ethylene oxide-propylene oxides), poly-alpha-olefins, hydrogenated poly-alpha-olefins, modified and/or unmodified polyalkalene glycols, various components commonly referred to as coalescents and/or plasticizers, base oils (including preferably API Group II and Group II+ Base Oils) or any combination of any of these, provided that the broad and/or preferred VOC and viscosity requirements described above are maintained. In certain highly preferred embodiments, the carrier is comprised of, and even more preferably comprises at least 50% by weight of, and even more preferably consists essentially of one or more API Group II or Group II+ Base Oils, including particularly the Base Oils sold under the trade designation PURITY by Petro-Canada. Especially preferred in certain embodiments are the API Group II Base Oils sold under the trade designation PURITY 1003, PURITY 1017, PURITY 1020, PURITY 1810 and PURITY 2305, and combinations of these. In certain embodiments it is preferred that the carrier comprise, and preferably consist essentially of, and even more preferably consist of, a Group II and/or Group II+ Base Oil having at least 95%, and even more preferably at least 99%, and even more preferably at least about 99.9% by weight of saturated compounds, such as PURITY 1003 base oil. Another material preferred in certain embodiments is the material sold by Petro-Canada under the trade designation PURITY VHVI4. In certain preferred embodiments the carrier also contains less than about 0.5% and even more preferably less than about 0.1% aromatic compounds, and also less than about 0.005% and even more preferably less than about 0.001% sulphur, as in the case with PURITY 1003 base oil.

In preferred embodiments, the present invention is directed to paints, and even more preferably premium paints, characterized by VOC of 100 g/l or less, and even more preferably by VOC of 50 g/l or less, and even more preferably by a VOC of about zero, comprising a defoaming agent of the present invention, preferably present in such paint in an amount of from about 0.1 to about 1% by weight of the paint, more preferably in an amount of less than about 0.8% by weight of the paint, and even more preferably in an amount of less than about 0.5% by weight of the paint. In certain highly preferred embodiments, the defoaming agent of the present invention is preferably present in the paint in an amount of from about 0.3% by weight of the paint or less.

Applicants have surprisingly found that the preferred defoaming agents of the present invention not only exhibit exceptionally desirable low-level of VOC, they are capable of being used in coating compositions, preferably paints, even more preferably premium paints, while maintaining comparable or superior performance properties relative to defoaming agents using standard mineral oil as the carrier. More particularly in preferred embodiments, the present invention comprises coatings or paints characterized by a VOC of 100 g/l, and even more preferably by VOC of 50 g/l or less, and even more preferably by a VOC of about zero, containing a defoaming agent in accordance and the present invention wherein the defoaming agent is present in an amount that is at least about 30% less than, and even more preferably at least about 50% less than the amount of standard mineral oil needed to achieve the substantially same level of performance, preferably as measured by one or more of the relevant performance properties of the paint or coating, including preferably bubble break time, % air—high speed agitation, and spreadability. As used herein, the term "standard mineral oil" refers to solvent refined heavy paraffinic distillate (petroleum) or solvent refined dewaxed heavy distillate, such as TUFFLO PROCESS OIL 10. As used herein, the term "% air—high speed agitation" refers to the RED DEVIL™ Paint Shaker method as described below. As used herein, the term "bubble break time" refers to the "Roller and Brush Dab Test Method" as described below. As used herein, the term "spreadability" means that upon coating the liquid film dries to a smooth and uniform finish, which is substantially free of craters and fisheyes.

Furthermore, applicants have found that preferred forms of the present invention are highly effective defoamers, as measured by bubble break times, while at the same time maintaining excellent spreadability characteristics and desirably low VOC levels as described herein above. For example, in preferred embodiments the defoaming agents of the present invention have a VOC level of not greater than about 1% by weight, and even more preferably of not greater than about 0.5%, while also being capable of producing paint bubble break times of less than 200 seconds, more preferably of less than 100, even more preferably less than about 75 seconds, when present in the paint at levels of about 1% by weight or less, more preferably less than about 0.75% by weight and even more preferably less than about 0.5% by weight.

EXAMPLES

All parts and percentages stated below are (unless stated otherwise) based on weight. The viscosities are based on measurements taken at 40° C.

RED DEVIL™ Paint Shaker Method: Material & Equipment
 RED DEVIL™ Shaker
 ½ pint can
 Paint Gravity Cup
 Balance
 Test medium—standard batch of defoamer-free paint (also free of entrained air)
 Defoamer reference standard
 Defoamer to be evaluated RED DEVIL™ Paint Shaker Method: Procedure
 1. Weigh 150 g sample of test paint into ½ pint paint can.
 2. Add defoamer to be evaluated at a level required by weight, based on weight of paint.
 3. Place can on mixer and mix for 5 minutes at slow speed (you do not want to beat air into paint, just mix defoamer into paint.)
 4. Seal can and place on outer edge of RED DEVIL™ Shaker clamp (farthest from axis of rotation) so that maximum arc is achieved.
 Note: cans must be placed in identical location on clamp for each test.
 5. Shake can for 5 minutes. Immediately after shaking, determine weight/gallon of shaken paint sample.
 6. The decrease in density compared with that of the unshaken control paint sample is regarded as the amount of foam generated.

% AIR ENTRAINED=[wt/gal (unshaken control)−wt/gal (test sample with defoamer)]/wt/gal (unshaken control)

Roller & Brush Dab Application: Material & Equipment
   3 -inch roller handle
   3 -inch roller cover, ⅜-inch nap
   SHERWIN-WILLIAMS® Test Paper
   2 -inch pro Edge sash brush
Roller & Brush Dab Application: Procedure
   1. Pre-soak 3 -inch roller cover and 2 -inch brush in de-ionized water and then spin dry.
   2. Pour paint on paper and saturate ⅜-inch nap roller.
   3. Apply paint to 12- by 13-inch sheet of SHERWIN-WILLIAMS®test paper mounted in vertical position, leaving a 4- by 4-inch square at the bottom right hand corner of panel for brush application test. Roller application technique should be consistent from test to test.
   4. Immediately upon completion of rollout, observe rate of bubble break.
   5. Saturate tip of paint brush with paint and apply paint to 4- by 4-inch square at bottom by dabbing the saturated brush for 10 strokes. Brush application technique should be consistent from test to test. Observe rate of bubble break.

Examples 1A, 1B and Comparative Examples 1C and 1D

Inventive defoaming agents A and B and comparative defoaming agents C and D in Table 1 below are prepared by simple mixing of the indicated active defoamer compounds identified in the table and the indicated concentration of the carrier using is standard production practices (amounts indicated are parts by weight).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A low VOC defoaming agent comprising at least one active defoaming compound and a liquid carrier, wherein:
   the at least one active defoaming compound comprises at least one hydrophobic polyethylene oxide glycol ether; and
   the liquid carrier consists essentially of an API Group II Base Oil having a viscosity of less than about 100 centistokes (cSt) at 40° C. as measured by ASTM 0445 and a VOC content as measured by ASTM method D3960 "Standard Practice for Determining Volatile Organic Compound (VOC) Content of Paints and Related Coatings" of not greater than about 1% by weight.

2. The low VOC defoaming agent of claim 1, wherein the liquid carrier has a viscosity of from about 5 to less than about 100 centistokes (cSt) at 40° C.

3. The low VOC defoaming agent of claim 2, wherein the at least one active defoaming compound is present in an amount of from about 0.5% to about 15% by weight of the defoaming agent.

4. The low VOC defoaming agent of claim 1, wherein the at least one active defoaming compound is present in an amount

TABLE 1

|  | DEFOAMING AGENT A | DEFOAMING AGENT B | COMPARATIVE DEFOAMING AGENT C | COMPARATIVE DEFOAMING AGENT D |
|---|---|---|---|---|
| Active Defoaming Compounds |  |  |  |  |
| hydrophobed polyethylene oxide glycerol ethers* | 4 | 4 | 4 | 4 |
| oxidized polyethylene homopolymer* | 7 |  | 7 |  |
| N,N'-ethylenebis-stearamide & palmitamide* |  | 5 |  | 5 |
| Carrier |  |  |  |  |
| Group II + Base Oil* | 89 | 91 |  |  |
| Mineral Oil* |  |  | 89 | 91 |
| PERFORMANCE RESULTS |  |  |  |  |
| VOC | <0.5% | <0.5% | 2% | 2% |
| Bubble Break Time, seconds | 60 | 65 | 60 | 65 |

*The hydrophobed polyethylene oxide glycerol ethers is an active defoaming compound made in accordance with U.S. Pat. No. 6,583,185.
The oxidized polyethylene homopolymer is a material sold by Honeywell under the trade designation AC325.
The N,N'-ethylenebisstearamide & palmitamide is a material sold by Lonza under the trade designation GLYCOWAX 765.
The Group II + Base Oil is a material sold by Petro-Canada under the trade designation PURITY 1003.
Bubble break time is measured at a loading of 0.3% by weight in Cognis Flat Acyrlic Topcoat Formula 758-82.
The mineral oil is the standard mineral oil as defined herinabove.

of from about 0.5% to about 15% by weight of the defoaming agent.

5. The low VOC defoaming agent of claim 1, wherein said carrier consists of an API Group II Base Oil.

* * * * *